United States Patent [19]

Martin

[11] 4,002,379
[45] Jan. 11, 1977

[54] OIL MIST LUBRICATION OF CENTRIFUGALLY LOADED BEARINGS

[75] Inventor: Guy E. Martin, Pittsburgh, Pa.

[73] Assignee: Aluminum Company of America, Pittsburgh, Pa.

[22] Filed: Nov. 10, 1975

[21] Appl. No.: 630,357

[52] U.S. Cl. .............................. 308/187; 184/6.26
[51] Int. Cl.² ........................................ F16C 33/30
[58] Field of Search ............... 308/78, 123, 187; 184/6.26, 6.18

[56] References Cited

UNITED STATES PATENTS

| | | | |
|---|---|---|---|
| 2,854,296 | 9/1958 | Eberle et al. | 308/187 X |
| 2,935,363 | 5/1960 | Schindel | 308/187 |
| 3,042,462 | 7/1962 | Rosskopf | 308/187 |
| 3,722,967 | 3/1973 | Lewis | 308/187 |

*Primary Examiner*—Robert R. Song
*Assistant Examiner*—Gene A. Church
*Attorney, Agent, or Firm*—Elroy Strickland

[57] ABSTRACT

The combination of a supporting member adapted to be rotated at relatively high rotational speeds and a mist lubricating means. The rotational member supports at least one bearing structure adjacent the periphery of the member such that with high rotational speeds of the member, the bearing structure is subjected to high centrifugal forces. The mist lubricating means supplies an essentially weightless lubricating mist to the bearing structure when the supporting member is rotated.

4 Claims, 4 Drawing Figures

OIL MIST LUBRICATION OF CENTRIFUGALLY LOADED BEARINGS

BACKGROUND OF THE INVENTION

The present invention relates generally to rotational members carrying bearing structures adjacent the periphery thereof, and particularly to an arrangement adapted to supply such bearing structures with a lubricating mist.

An example of apparatus utilizing peripherally located bearing structures or units are machines designed to coil an elongated strand of material, such machines employing a large, horizontally disposed, rotatable disc or flyer, a detailed description of such machines and their operation being described hereinafter. When the disc or flyer rotates at relatively high speeds, the peripherally located bearing units are subject to substantial centrifugal force, the formula for such force being the well known $F = Wv^2/gR$. Heretofore, however, the rotational speeds of flyers have not been relatively high, and the bearing structures have been sealed units packed with grease, the weight of the grease in each sealed unit being taken into account, along with the weight of the bearing structure itself and an associated sheave or pulley, in balancing the flyer to provide a smoothly rotatable device. With the lower peripheral velocity accompanying conventional, low rotational speeds (on the order of 250 rpms for 30 inch diameter flyer), the grease has tended to remain in the bearing units such that the loss of the grease was not a significant problem. For this reason bearing failures were not common, and the resulting unbalance of the flyer, due to the change in mass occurring with the loss of grease, was not a common occurrence.

However, with the event of the increase in rotational speeds (870 rpm, for example for a 30 inch diameter flyer) for the purpose of increasing the production of coiled wire, which results in lower unit costs, the loss of grease from the bearing units has become a problem (keeping in mind the above formula in which the centrifugal force increases with the square of rotational velocity) resulting in regular bearing failure and unbalance of the rotating flyer.

In addition, lubricating greases are a mechanical suspension of ingredients which tend to separate under high centrifugal action such that their lubricating capabilities are destroyed. This has been another cause of bearing failure in devices subjecting bearings to high centrifugal forces.

BRIEF SUMMARY OF THE INVENTION

The present invention is directed to lubricating centrifugally loaded bearings in a manner that eliminates the problem of loss of gease and the resulting unbalance of a rotating member while simultaneously ensuring lubrication and cooling of the bearings. This is accomplished by the use of a lubricating mist continually directed to the loaded bearing units, the mist having a negligible weight in the bearing units such that the balance of the rotating member is unaffected by the presence of the mist. In addition, the flow of air (carrying the mist) through the bearing unit tends to cool the same, as well as preventing contamination of the unit with foreign substances. Further, since the use of grease as the lubricating substance is not required, seals are not required to retain the grease in the bearing units such that there is now no friction generated between the rotating portions of the bearing unit and such seals; the absence of seals thus contributes further to the cooling function provided by the air flow carrying the lubricating mist.

The use of a mist to lubricate rotating bearings is not new, the mist lubrication of rolling mill bearings being an example of such use. In addition, oil mists are used in high speed rotating apparatus such as shown and described in Herrmann U.S. Pat. No. 2,986,433 and Majkrzak U.S. Pat. No. 3,447,314. Other patents showing the use of oil mist as a lubricating mechanism are the following U.S. Pat. Nos.: Belcher 2,969,879; Rosskopf 3,042,462; Munn 3,543,879; Rohr 3,624,763; Kern et al, 3,666,049; and Willuweit et al 3,877,547. However, none of these patents are concerned with the lubricating problems attendant with high centrifugal speeds and forces.

THE DRAWINGS

The advantages and objectives of the invention will be better understood in considering the following detailed description in connection with the accompanying drawings in which.

PREFERRED EMBODIMENT

Figure 1:
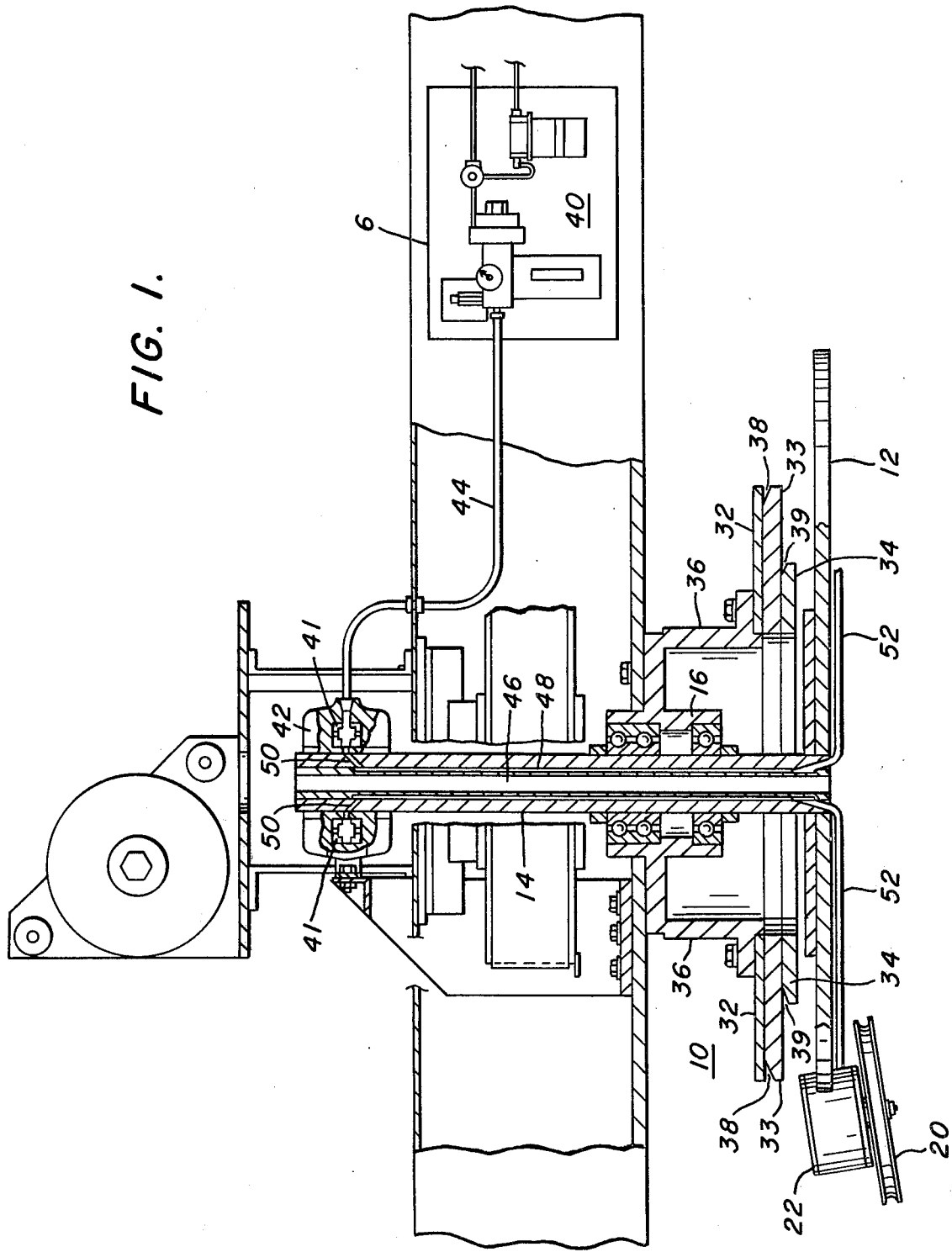
FIG. 1 is a vertical section of apparatus employing the principles of the invention.
Figure 2:
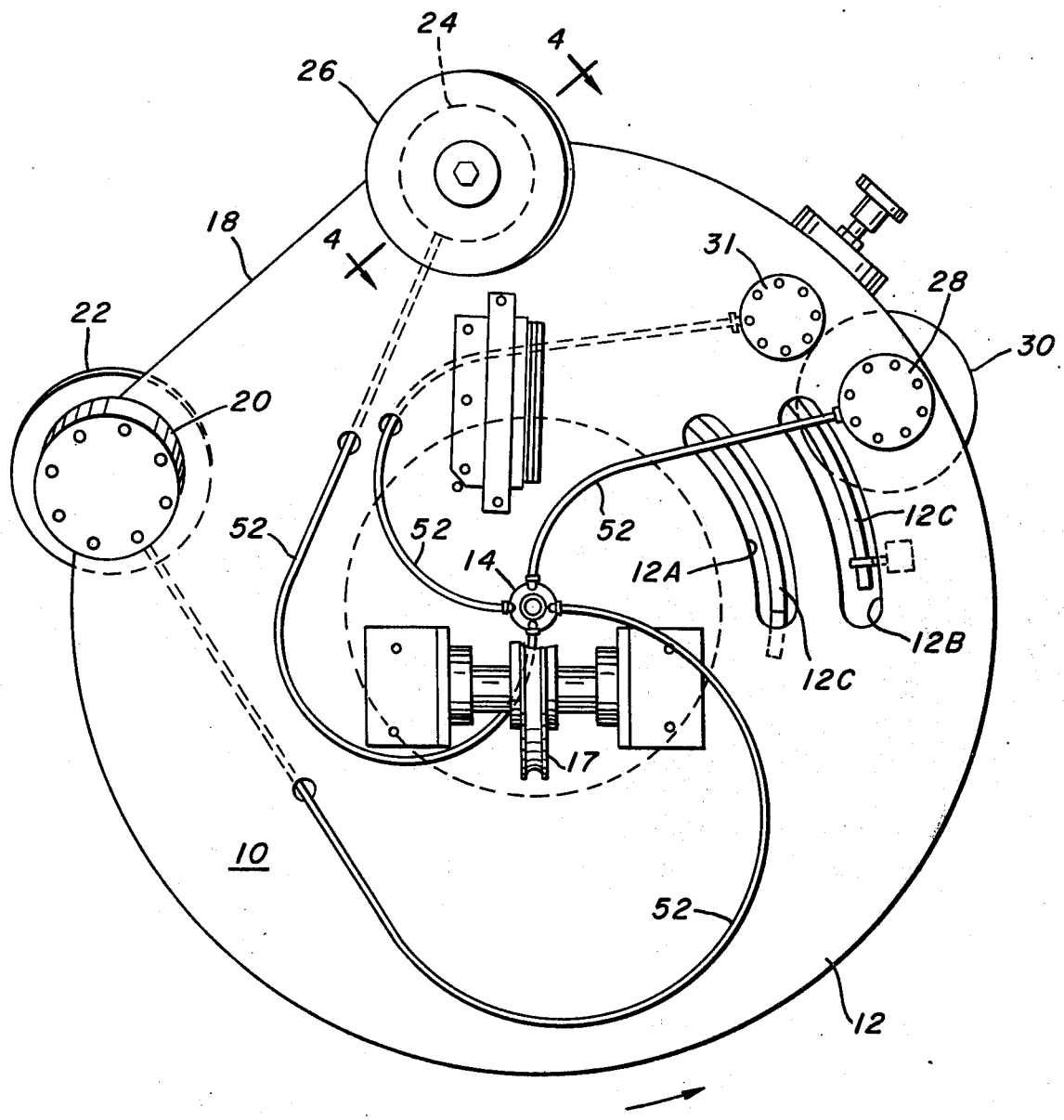
FIG. 2 is a bottom view of the apparatus of FIG. 1.
Figure 3:
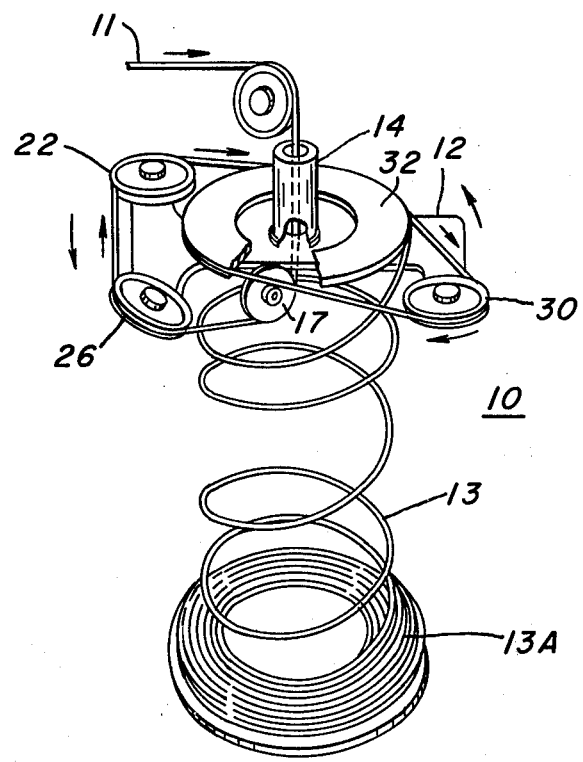
FIG. 3 is a diagrammatic representation of the apparatus depicted in FIGS. 1 and 2.

Referring now to the drawings, FIGS. 1 to 3 thereof show a machine 10 designed to pull a strand of material 11 (FIG. 3) from a process unit (not shown) and to coil the material pulled from the apparatus into continuous large diameter loops 13, with each loop being continuously disposed in a stack of loops 13A beneath the machine, and shown in FIG. 3.

More particularly, such a machine generally comprises a large diameter plate member 12, commonly known as a flyer, horizontally disposed and mounted on the lower end of a hollow, vertical shaft 14. The shaft is supported in a bearing unit 16 (FIG. 1) and adapted to be rotated by an electric or fluid operated motor (not shown) located beside the apparatus shown in FIG. 1. Beneath the flyer is located a sheave 17 supported on the flyer for rotation therewith and for rotation on a substantially horizontal axis. The periphery of the sheave is aligned with the center of shaft 14.

As best seen in the view of FIG. 2, the structure of plate member or flyer 12 is not necessarily a perfect circle, as one edge portion 18 of the flyer is shown as a noncircular, generally straight edge portion. (In FIG. 3, the flyer is schematically represented as an elongated structure having arms supporting sheaves, as described hereinafter.) Adjacent the opposed ends of the noncircular portion 18, and mounted on and attached to the periphery of the flyer and eccentric to the structure of the flyer and its supporting shaft, are two bearing units 20 and 24 rotatably supporting two sheaves or pulleys 22 and 26 respectively. A third bearing unit 28 and associated sheave 30 are mounted on and attached to the periphery of the flyer and spaced from bearing unit and sheave 24, 26 a distance closely approximating the distance between bearing units and sheaves 20, 22 and 24, 26. A fourth bearing unit and sheave 31 is shown mounted on the flyer at a location between bearing units 24 and 28 and in closed proximity to bearing unit and sheave 28, 30, as seen in FIGS. 1 and 2.

In continuing reference to FIG. 1 of the drawings, three stationary plate structures 32, 33 and 34 are shown attached to the housing forming a part of the bearing structure 16 supporting the shaft via an integral extension 36 of the housing. The three plates are centered on shaft 14 and are serially and vertically disposed together in direct abutting relationship. Plates 32 and 33 have substantially the same diameter, with one of the plates (33 in FIG. 1) having, as shown, a peripheral bevel that provides a peripheral, V-shaped groove 38 between the two plates. Similarly, lower plate 34, which has a diameter smaller than those of plates 32 and 33, is provided with a peripheral bevel to provide a similar groove 39 with the plate (33) located immediately above it. Grooves 38 and 39 are adapted to receive a strand of elongated material in a coiling process presently to be described.

The structure of coiling apparatus 10, as thus far described, involves a known, conventional machine designed to pull a strand of material 11 (FIG. 3) from apparatus, such as wire drawing dies and associated equipment, and coiling the same in coil bundles 13A for future use and/or shipment. This is accomplished by initially feeding the strand 11 to be coiled down through the center of hollow shaft 14 (with continuing reference to FIG. 3) to center sheave 17. Sheave 17 provides a right angle turn for the strand to direct the same out to peripheral sheave 26 angled to receive the strand from sheave 17. (In FIG. 2, sheave 17 is shown located to receive a complete wrap of the strand before the strand is directed to sheave 26, on the upper side of sheave 17.) The strand unit is next extended to and around sheave 22 and then to the V-groove of 38 or 39 of stationary plates 32 and 33 or 33 and 34. From the V-groove and plates, the strand is then located around sheave 30 and returned to the V-groove of the stationary plates. From the V-groove and plates, the strand is now directed through the flyer 12 by passing through an opening 12A or in 12B (FIG. 2) provided in the flyer. Parenthetically, V-groove 38 may have a diameter of 30 inches, for example, while the diameter of V-groove 39 may be 22 inches, the two grooves being employed to produce loops of strand material, as desired, of two different diameters, the diameters of such coils closely corresponding to the diameters of V-grooves 38 or 39.

When flyer 12 is rotated, with the wire initially strung and wound on apparatus 10 in the manner just described, the strand material is continuously pulled from the process apparatus and wrapped in V-groove 38 or 39 (of the stationary plates) by the sheaves 22, 26 and 30, this process continuously completing a loop of strand material for every cycle of rotation of the flyer. After each loop is formed, it is removed from the V-groove and stationary plates by a stripper tube 12C located on the flyer and over opening 12A or B (depending upon the diameter of the loops being formed). The strand of each loop travels through the tube and passes down through opening 12A or B (in the flyer) to a location beneath apparatus 10 in the process of forming the circular package 13A of loops 13.

Conventionally, the rotational speed of the flyer in the above process has been relatively low, i.e. on the order of 250 rpm for use with a 30 inch dead block (plates 32 and 33), as discussed above. With such speeds, the bearings in units 20, 24, 28 and 31 have been lubricated by grease packed and sealed in the housings of the bearing units by suitable seals (not shown) located between the rotating and stationary portion of the bearing units, the centrifugal forces involved at these speeds generally being insufficient to force the grease past the seals and from the units. Moreover, since the grease in these units is substantially a fixed quantity, the flyer is balanced in terms of weight of the grease, so that with continued operation of coiling apparatus 10 the flyer will maintain its essential balance.

However, with increases in the rotational speeds of flyers, the bearing structures located at the peripheries of such flyers are subjected to such increases in centrifugal force that the seals of the bearing are unable to retain the grease packed in the units, the grease being forced out of the units by centrifugal forces occurring with rotation of the flyer. The loss of the grease leaves the bearings without lubrication and the flyer unbalanced.

To allow the use of the increased speeds of rotation for devices having peripherally located bearings, the present invention employs an essentially weightless mist to lubricate such bearings in place of grease, the essential weightlessness of the mist permitting the rotating member (i.e. the flyer) to be balanced without consideration of any mass of the mist, and thus to remain in balance with long-term, continued use of the apparatus.

Means suitable for supplying peripherally located bearing units, such as 20, 24, 28 and 31, with a lubricant mist is shown in FIGS. 1 and 2 of the drawings, the means including a device 40 capable of producing a lubricating mist, such as an oil mist, such devices being generally known as mist generators that are commercially available. The generator 40 is connected in fluid communication with the fixed portion 41 of a rotary union 42, by a conduit 44, the rotary union being shown connected to the upper end of vertical shaft 14 in FIG. 1. As shown, vertical shaft 14 includes an inner, concentric shaft 46 splined to the main, outer shaft 14, the splines of the shaft providing inner, linear passageways 48 along the length of the shafts. These passageways are placed in fluid communication with conduit 44 by openings 50 provided in the main shaft and extending radially outwardly from the passageways of the splines, as seen in FIG. 1.

Figure 4:
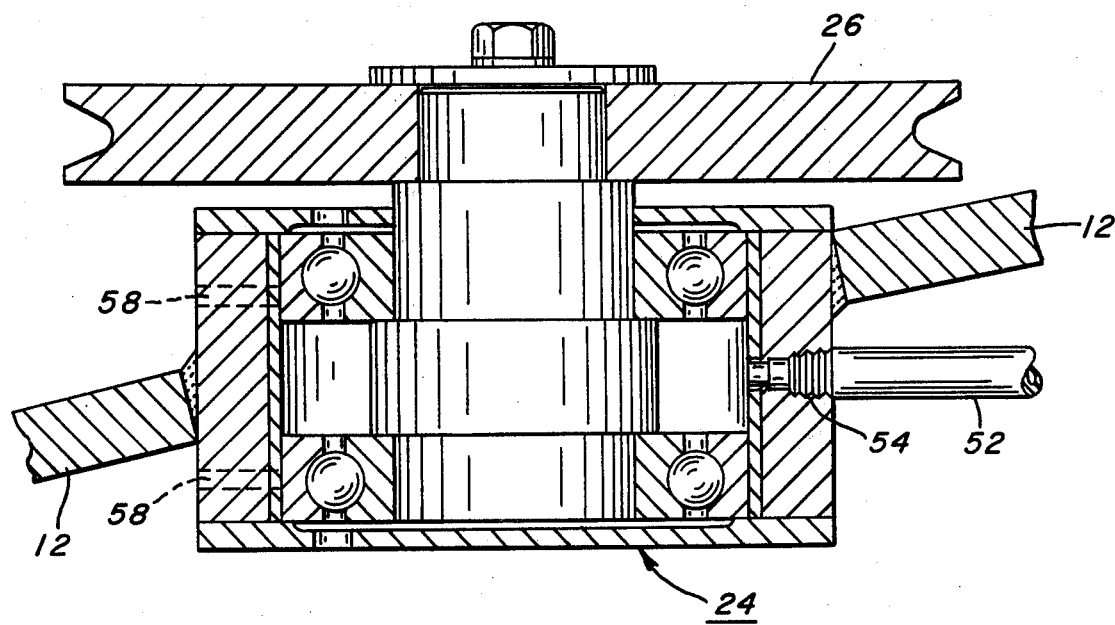
FIG. 4 is a cross section of a bearing unit and sheave of the apparatus of FIGS. 1 and 2.

At the lower end of the concentric shafts, the linear passageways 48 thereof are connected in fluid communication with bearing units 20, 24, 28 and 31, respectively, by four circumferentially spaced conduits 52 (FIG. 2) extending radially outwardly from shaft 14 to the bearing units. As best seen in FIG. 4 of the drawings, each conduit 52 can be connected to a bearing unit by a suitable fitting 54 threaded into the wall of the housing of each bearing unit.

In the operation of apparatus 10, in combination with the mist generator and system just described, a lubricant mist is generated in the generator 40 in a known manner and directed to rotary union 42, via conduit 44, under suitable pressure by a stream of mist issuing from the generator. From the rotary union and the radial openings 50 in shaft 14, the stream of air carries the mist down the passageways, between shafts 14 and 46, and to the bearing units by respective conduits 52. Openings 58 (FIG. 4) can be provided in the wall of bearing housings to relieve any back pressure existing in the bearing unit so that a free flow of mist can exit from the units, less the lubricant that has wetted bearing surfaces. However, no accumulation of lubricant takes place in the bearing units.

With the use of a lubricant mist, which mist is essentially weightless, the balance of the flyer is unaffected by the mist so that high rotational speeds of the flyer speeds are now possible without concern of a change occurring in flyer balance due to a loss of grease, the mist simultaneously insuring adequate lubrication of the bearings. Similarly, the separation of the suspension of ingredients that comprise such a grease that can occur with high centrifugal forces is not a problem in the present invention since the mist is not held in the bearing to be acted upon by such forces.

In addition, no seals are required in the bearing units, in the present invention since there is no attempt to retain the lubricating substance (the mist) in the units. And, without the use and need of seals, the bearings inherently run cooler since bearing seals, being a fixed means disposed in rubbing, frictional contact with the spindle or shaft of the bearing, generate heat due to the rubbing contact. Further cooling of the bearings, of course, is effected by the flow of air and mist through the bearing units.

In the view of FIG. 2, the conduits 52 are shown radially arced in the direction of the rotation of flyer 12. With such an arc arrangement, the rotation of the flyer assists the flow of lubricant mist to the bearing units.

While the invention has been described in terms of preferred embodiments, the claims appended hereto are intended to encompass all embodiments which fall within the spirit of the invention.

Having thus described my invention and certain embodiments thereof, I claim:

1. In combination,
    a substantially planar supporting member adapted to be rotated about an axis extending generally perpendicular to the plane of the member, and at relatively high rotational speeds,
    at least one bearing unit supported on and adjacent the periphery of said member, such that the bearing unit is eccentrically located with respect to the axis of rotation of the supporting member, and is subjected to high centrifugal forces when the supporting member is rotated at high rotational speeds, and,
    means adapted to supply the bearing unit with an essentially weightless lubricating mist.

2. The combination of claim 1 in which means adapted to supply the lubricating mist includes a device for generating a lubricating fluid mist, said device being connected in fluid communication with the bearing unit.

3. In combination,
    an oil mist generator,
    a member adapted to be rotated at relatively high rotational speeds, and eccentrically supporting at least one bearing unit adjacent the periphery of said member, such that with the high rotational speeds of the supporting member, the bearing unit is subjected to high centrifugal forces,
    means connecting the oil mist generator in fluid communication with the bearing unit for conducting oil mist to the bearing structure when the supporting member is rotated,
    the means connecting the oil mist generator in fluid communication with the bearing unit including a longitudinally extending opening provided internally of the rotatable shaft,
    a rotary union mounted on said shaft having a fixed opening disposed in fluid communication with the longitudinal opening,
    a conduit means connecting the fixed opening of the rotary union and oil mist generator in fluid communication with each other, and,
    a conduit means connecting the bearing unit and the longitudinal opening in the rotatable shaft in fluid communication with each other.

4. The combination of claim 3 in which the conduit means connecting the bearing unit in fluid communication with the opening in the rotatable shaft includes a conduit arc portion extending generally in the direction of rotation of the supporting member so that the flow of oil mist in the conduit means is aided by the rotation of the supporting member.

* * * * *